(12) United States Patent
Chang et al.

(10) Patent No.: US 9,133,884 B2
(45) Date of Patent: Sep. 15, 2015

(54) DEFLECTING DEVICE FOR BALL SPLINE DEVICE

(71) Applicant: Hiwin Technologies Corp., Taichung (TW)

(72) Inventors: Che Kang Chang, Taichung (TW); Zong Sian Jiang, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 0 days.

(21) Appl. No.: 14/135,690

(22) Filed: Dec. 20, 2013

(65) Prior Publication Data

US 2015/0176657 A1    Jun. 25, 2015

(51) Int. Cl.
  *F16C 3/035*  (2006.01)
  *F16D 3/06*   (2006.01)
  *F16D 3/50*   (2006.01)

(52) U.S. Cl.
CPC . F16D 3/065 (2013.01); F16D 3/50 (2013.01)

(58) Field of Classification Search
CPC .......................... F16D 29/0685; F16D 29/0688
USPC ....................... 464/168; 384/43, 44
See application file for complete search history.

(56) References Cited

U.S. PATENT DOCUMENTS

| 4,634,296 | A  | * | 1/1987  | Watanabe ............... 464/168 X |
| 4,655,611 | A  | * | 4/1987  | Kondo |
| 4,764,032 | A  | * | 8/1988  | Tanaka ........................ 384/44 |
| 5,893,646 | A  | * | 4/1999  | Mizutani et al. ............ 384/43 |
| 6,637,941 | B2 | * | 10/2003 | Greiner ........................ 384/43 |
| 7,523,682 | B2 |   | 4/2009  | Liao et al. |
| 7,934,438 | B2 |   | 5/2011  | Chen et al. |
| 8,051,736 | B2 |   | 11/2011 | Chen et al. |

* cited by examiner

*Primary Examiner* — Gregory Binda
(74) *Attorney, Agent, or Firm* — Charles E. Baxley

(57) ABSTRACT

A ball spline device includes a shaft engaged into a nut member and having a number of longitudinal channels and recesses aligned with each other for engaging with ball bearing members, the nut member includes a number of grooves, and two deflecting devices are engaged onto the shaft and the nut member and each include a number of curved guiding pathways each having an inlet portion communicating with the recess of the nut member for guiding the ball bearing members into and out of the curved guiding pathways of the deflecting devices, and an outlet portion communicating with the groove of the nut member for guiding the ball bearing members into and out of the grooves of the nut member.

10 Claims, 3 Drawing Sheets

DEFLECTING DEVICE FOR BALL SPLINE DEVICE

BACKGROUND OF THE INVENTION

1. Field of the Invention

The present invention relates to a deflecting device for a ball spline device, and more particularly to a deflecting device including an anchoring structure for anchoring the deflecting device to the ball spline device and for guiding the ball bearing members to smoothly move through the endless ball guiding passage of the ball spline device.

2. Description of the Prior Art

Typical ball spline devices comprise a nut threaded onto an elongated bolt or screw and rotatable and movable or adjustable along the screw, one or more endless ball guiding passages formed in the ball spline device for slidably receiving ball bearing members, and one or more ball return pipes attached onto the ball spline device for guiding the ball bearing members to smoothly and suitably move through the endless ball guiding passages of the ball spline device.

For example, U.S. Pat. No. 7,523,682 to Liao et al., U.S. Pat. No. 7,934,438 to Chen et al., and U.S. Pat. No. 8,051,736 to Chen et al. disclose several of the typical ball screw return systems each comprising one or more ball return pipes engaged onto a nut for guiding the ball bearing members to smoothly move through the endless ball guiding passage of the ball screw and nut combination.

However, the ball return pipes should be highly supported above the nut with the tube support flanges, and may not be closely or precisely secured to the nut, and the tubular tongues of the ball return pipe may not be precisely directed toward the endless ball guiding passage of the ball spline device. In addition, two or more 90-degree returning angles or sharp returning angles or curvatures will be formed in the endless ball guiding passage of the ball return pipe such that the ball bearing members may not be smoothly moved through the endless ball guiding passage of the ball screw and nut combination.

The present invention has arisen to mitigate and/or obviate the afore-described disadvantages of the conventional ball return devices for the ball spline devices.

SUMMARY OF THE INVENTION

The primary objective of the present invention is to provide a deflecting device including an anchoring structure for anchoring the deflecting device to the ball spline device and for guiding the ball bearing members to smoothly move through the endless ball guiding passage of the ball spline device.

In accordance with one aspect of the invention, there is provided a ball spline device comprising an elongated shaft including a number of longitudinal channels formed therein, a nut member includes a bore for engaging with the shaft, the nut member includes two end portions each having a compartment communicating with the bore of the nut member, the compartments of the nut member includes an inner diameter greater than an inner diameter of the bore of the nut member for forming an inner peripheral swelling in the nut member, the nut members includes a number of longitudinal recesses formed in the swelling and communicating with the bore of the nut member and aligned with the longitudinal channels of the shaft, and includes a number of longitudinal grooves communicating with the compartments of the nut member, but offset from the bore of the nut member, a number of ball bearing members are engaged in the longitudinal channels of the shaft and the longitudinal recesses of the swelling of the nut member, and two deflecting devices are engaged onto the shaft and engaged into the compartments of the nut member and attached to the end portions of the nut member respectively, the deflecting devices each include a number of curved guiding pathways formed therein, and the curved guiding pathways of the deflecting devices each include an inlet portion directed toward and communicating with the longitudinal recess of the nut member and the longitudinal channel of the shaft for guiding the ball bearing members into and out of the curved guiding pathways of the deflecting devices respectively, and the curved guiding pathways of the deflecting devices each include an outlet portion directed toward and communicating with the groove of the nut member respectively for forming an endless ball guiding passage in the ball spline device and for guiding the ball bearing members into and out of the grooves of the nut member.

The nut member includes two retaining rings engaged in the end portions of the nut member respectively and engaged with the deflecting devices respectively for retaining and positioning the deflecting devices in the nut member.

The deflecting devices each include an opening formed therein for slidably receiving and engaging with the shaft, and each include a number of bulges extended radially into the opening and slidably engaged with the channels of the shaft for positioning the deflecting devices to the shaft.

The nut member includes a number of cavities formed in the swelling and communicating with the compartments of the nut member, and the deflecting devices each include a number of positioning pins extended outwardly therefrom for engaging with the cavities of the nut member and for anchoring the deflecting devices to the nut member.

The curved guiding pathways of the deflecting devices each include a width no less than an outer diameter of the ball bearing members for suitably or smoothly receiving or engaging with the ball bearing members.

The inlet portions of the curved guiding pathways of the deflecting devices are inclined and each include a climbing height smaller than a climbing length of the inlet portions of the curved guiding pathways of the deflecting devices.

The climbing length of the inlet portions of the curved guiding pathways of the deflecting devices is no less than 0.25 times the outer diameter of the ball bearing members, and no greater than 0.5 times the outer diameter of the ball bearing members.

The curved guiding pathways of the deflecting devices each include an inlet curved segment communicating with the inlet portion of the curved guiding pathway of the deflecting device, and an outlet curved segment communicating with the outlet portion of the curved guiding pathway of the deflecting device.

The inlet and the outlet curved segments of the curved guiding pathway of the deflecting device include a radius no less than 0.5 times the outer diameter of the ball bearing members, and no greater than the outer diameter of the ball bearing members.

The inlet curved segment of the guiding pathway of the deflecting device includes a bottom portion jointed at a joint point with a bottom portion of the outlet curved segment of the curved guiding pathway of the deflecting device.

The bottom portion of the inlet curved segment of the curved guiding pathway of the deflecting device includes a center of curvature and a radius, and the bottom portion of the outlet curved segment of the curved guiding pathway of the deflecting device includes a center of curvature and a radius greater than the radius of the bottom portion of the inlet curved segment of the curved guiding pathway of the deflecting device.

The bottom portion of the inlet curved segment of the curved guiding pathway of the deflecting device includes a length greater than one half (½) of a length of the bottom portion of the outlet curved segment of the curved guiding pathway of the deflecting device, and less than 0.8 times the length of the bottom portion of the outlet curved segment of the curved guiding pathway of the deflecting device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
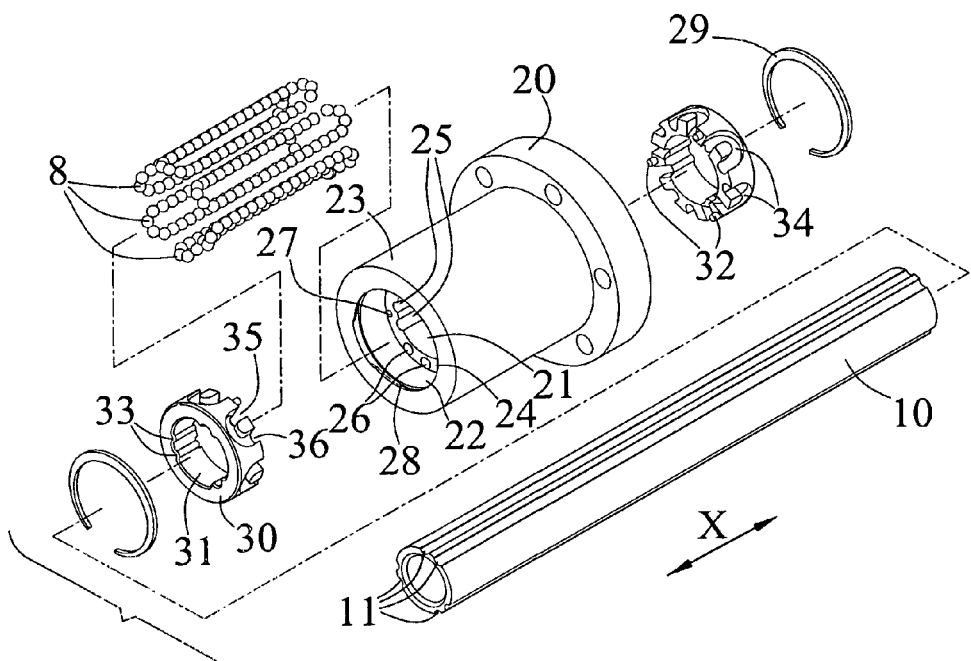
FIG. 1 is a partial exploded view of a ball spline device including an improved deflecting device in accordance with the present invention.
Figure 2:
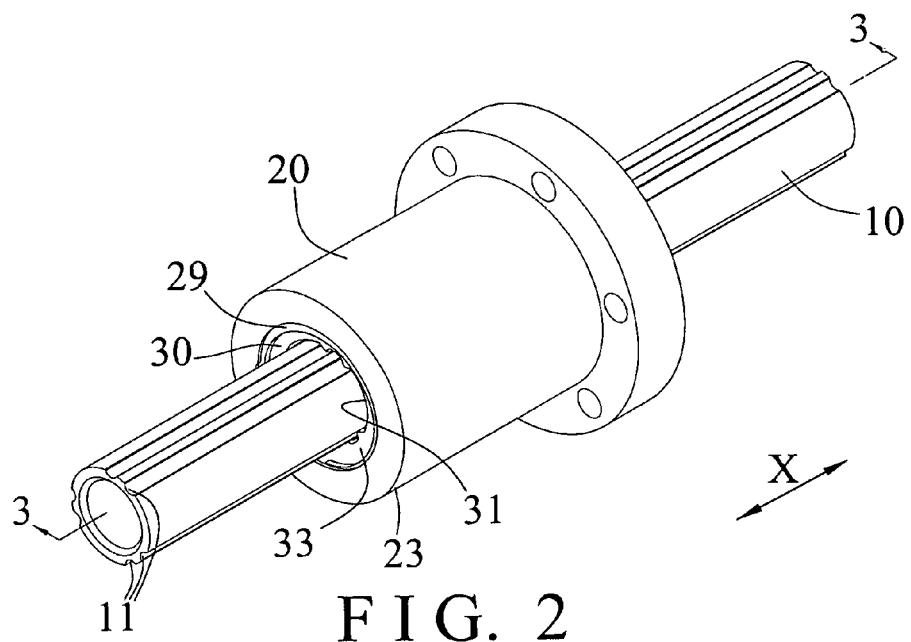
FIG. 2 is a perspective view of the ball spline device.
Figure 3:
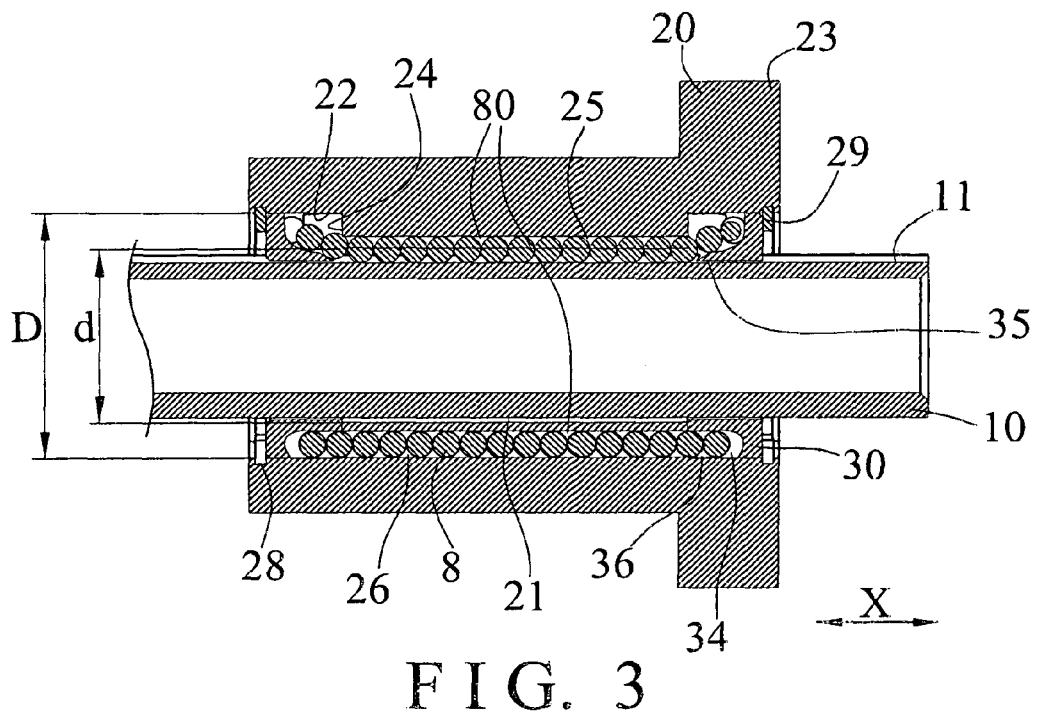
FIG. 3 is a partial cross sectional view of the ball spline device taken along lines 3-3 of FIG. 2.
Figure 4:
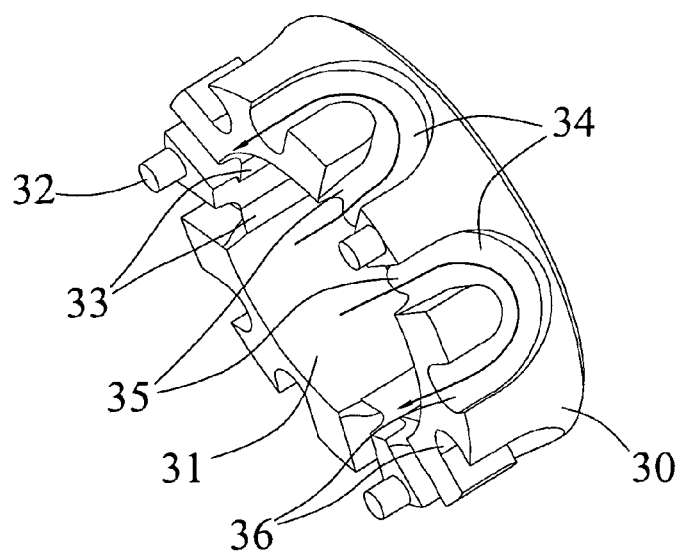
FIG. 4 is a perspective view illustrating one of the deflecting devices of the ball spline device.

Referring to the drawings, and initially to FIGS. 1-3, a ball spline device in accordance with the present invention comprises an elongated bolt or spline or shaft 10 including one or more (such as three) pairs, or one or more (such as six) longitudinal recesses or slots or grooves or channels 11 formed therein, such as formed on the outer peripheral portion thereof and arranged along an X-axis for slidably receiving or engaging with the ball bearing members 8. The ball spline device further comprises a nut member 20 including a compartment or chamber or bore 21 formed therein for slidably receiving or engaging with the shaft 10 and for allowing the nut member 20 to be slid and moved along the shaft 10, and including a chamber or compartment 22 formed in each of the end portions 23 of the nut member 20 and communicating with the bore 21 of the nut member 20.

As best shown in FIGS. 1, 3, the compartments 22 of the nut member 20 include an inner diameter (D, FIG. 3) greater than the inner diameter (d, FIG. 3) of the bore 21 of the nut member 20 for forming or defining an inner peripheral flange or wall or bulge or swelling 24 in the nut member 20, the nut member 20 further includes one or more (such as three) pairs, or one or more (such as six) longitudinal depressions or grooves or channels or recesses 25 formed therein, such as formed in the swelling 24 and communicating with the bore 21 of the nut member 20 and arranged along the X-axis for selectively aligning with the channels 11 of the shaft 10 and also for slidably receiving or engaging with the ball bearing members 8, and further includes one or more (such as three) pairs, or one or more (such as six) longitudinal channels or slots or pathways or grooves 26 formed therein and also arranged or extended along the X-axis.

As also shown in FIG. 1, the grooves 26 of the nut member 20 are formed in the swelling 24 and communicating with the compartments 22 of the nut member 20, but spaced or separated or offset from the bore 21 of the nut member 20, also for slidably receiving or engaging with the ball bearing members 8. The nut member 20 further includes one or more (such as three) holes or cavities 27 formed in each of the end portions 23 of the nut member 20, such as formed in the swelling 24 and communicating with the respective compartment 22 of the nut member 20, and further includes an inner peripheral groove or channel or recess or slot or depression 28 formed in each of the end portions 23 of the nut member 20 and communicating with the respective compartment 22 of the nut member 20 for receiving or engaging with a clamping or anchoring or retaining ring 29.

The ball spline device further comprises two deflecting devices 30 to be disposed or engaged onto the shaft 10 and to be disposed or attached or mounted or secured to the end portions 23 of the nut member 20 with latches or fasteners and/or with the retaining rings 29. For example, the deflecting devices 30 each include a substantially ring or O-shaped structure or configuration having a compartment or chamber or bore or central opening 31 formed therein for slidably receiving or engaging with the shaft 10 and for allowing the deflecting devices 30 to be slid and moved along the shaft 10, and each include one or more (such as three) anchoring or retaining or positioning pins 32 extended laterally or axially and outwardly therefrom (FIGS. 1, 4-6) for engaging with the cavities 27 of the nut member 20 and for anchoring or retaining or positioning the deflecting devices 30 to the nut member 20.

The deflecting devices 30 each further include one or more (such as three) pairs, or one or more (such as six) ribs or flanges or swellings or protrusions or bulges 33 extended radially and inwardly into the opening 31 thereof (FIGS. 1, 4, 7) for slidably engaging with the channels 11 of the shaft 10 (FIG. 2) and for further anchoring or retaining or positioning the deflecting devices 30 to the shaft 10 and for guiding the deflecting devices 30 to slide and move longitudinally along the shaft 10, and for preventing the deflecting devices 30 and the nut member 20 from being pivoted or rotated relative to the shaft 10, the retaining rings 29 are contacted or engaged with the deflecting devices 30 respectively for solidly and stably anchoring or retaining or positioning the deflecting devices 30 in the nut member 20.

Figure 5:
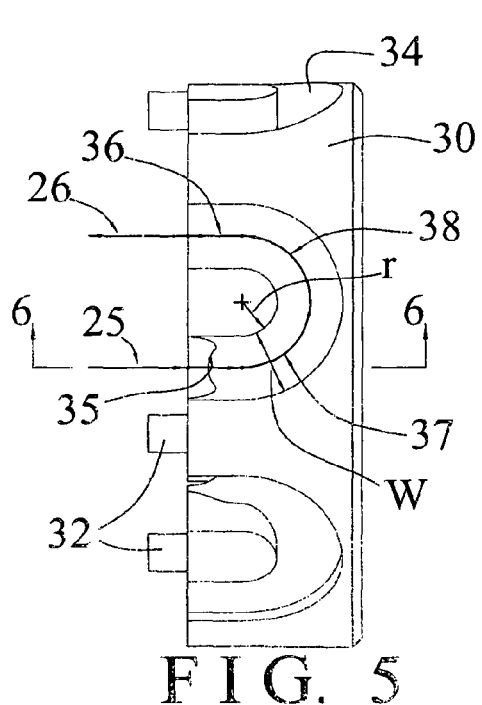
FIG. 5 is a side plan schematic view of the deflecting device of the ball spline device.

The deflecting devices 30 each further include one or more (such as three) pairs, or one or more (such as six) curved guiding recesses or depressions or channels or slots or grooves or pathways 34 formed therein and aligning or communicating the grooves 26 with the recesses 25 of the nut member 20 respectively for forming or defining one or more (such as six) endless ball guiding passages 80 (FIG. 3) in the ball spline device and for slidably receiving or engaging with the ball bearing members 8. As shown in FIG. 5, the curved guiding pathways 34 of the deflecting devices 30 each include an inner diameter or width (W) equal to or slightly greater than or no less than the outer diameter (B, FIG. 6) of the ball bearing members 8 for suitably or smoothly receiving or engaging with the ball bearing members 8.

The curved guiding pathways 34 of the deflecting devices 30 each further include an inlet or entrance segment or portion 35 directed toward or aligned with or communicating with or engaged into the recess 25 of the nut member 20 and/or engaged into the channel 11 of the shaft 10 (FIG. 3) for receiving and guiding the ball bearing members 8 into or out of the curved guiding pathway 34 of the deflecting device 30, and an exit or outlet segment or portion 36 directed toward or aligned with or communicating with the groove 26 of the nut member 20 for forming or defining or completing the endless ball guiding passage 80 in the ball spline device and for guiding the ball bearing members 8 into or out of the groove 26 of the nut member 20, and an inlet quarter or curved portion or segment 37 communicating with the inlet or entrance portion 35, and an outlet quarter or curved portion or segment 38 communicating with the exit or outlet portion 36 of the curved guiding pathway 34 of the deflecting device 30.

Figure 6:
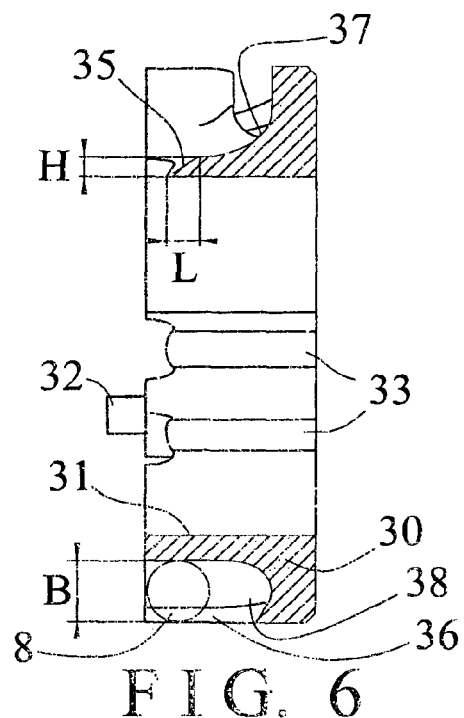
FIG. 6 is a cross sectional view of the deflecting device of the ball spline device taken along lines 6-6 of FIG. 5.

As shown in FIG. 5, the radius (r) of the curved segments 37, 38 of the curved guiding pathway 34 of the deflecting device 30 is equal to or slightly greater than or no less than 0.5×B, in which (B) is the outer diameter of the ball bearing members 8, and equal to or slightly less than or no greater than (B); i.e., $0.5 \times B \leq r \leq B$. As shown in FIG. 6, the entrance portion 35 of the guiding pathway 34 of the deflecting device 30 is tilted or inclined and includes a climbing height (H) smaller than the climbing length (L), and the climbing length (L) is equal to or slightly greater than or no less than 0.25×B and equal to or slightly less than or no greater than 0.5×B; i.e., $0.25 \times B \leq L \leq 0.5 \times B$, in which (B) is the outer diameter of the ball bearing members 8, and as seen from the end portion of the deflecting device 30, the inscribed bottom portions (e, f) of the curved segments 37, 38 of the curved guiding pathway 34 of the deflecting device 30 are jointed or merged at a joint point (g), as shown in FIG. 7.

Figure 7:
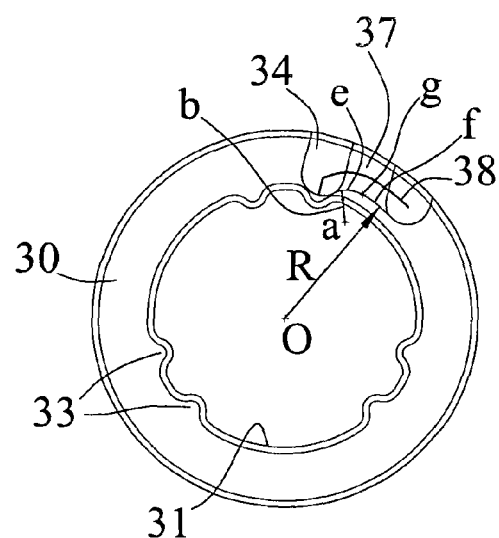
FIG. 7 is an end plan schematic view of the deflecting device of the ball spline device.

As also shown in FIG. 7, as seen from the end portion of the deflecting device 30, the bottom portion (e) of the inlet curved segment 37 of the curved guiding pathway 34 of the deflecting device 30 includes a center of curvature located at (a), and includes a radius (b), and the bottom portion (f) of the outlet curved segment 38 of the curved guiding pathway 34 of the deflecting device 30 includes a center of curvature (O) located at the center (O) of the deflecting device 30, and includes a radius (R) greater than the radius (b) of the bottom portion (e) of the inlet curved segment 37 of the curved guiding pathway 34 of the deflecting device 30, and the length of the bottom portion (e) of the inlet curved segment 37 of the curved guiding pathway 34 of the deflecting device 30 is greater than one half (½) of the length of the bottom portion (f) of the outlet curved segment 38 of the curved guiding pathway 34 of the deflecting device 30, and less than 0.8×f; i.e., $0.5 \times f < e < 0.8 \times f$, for guiding the ball bearing members 8 to smoothly move through the curved guiding pathway 34 of the deflecting device 30.

In operation, as shown in FIG. 3, the inlet portions 35 of the curved guiding pathways 34 of the deflecting devices 30 are directed toward or aligned with or communicating with or engaged into the recesses 25 of the nut member 20 and/or engaged into the channels 11 of the shaft 10 for receiving and guiding the ball bearing members 8 into or out of the curved guiding pathways 34 of the deflecting devices 30 respectively, and the exit or outlet portions 36 of the curved guiding pathways 34 of the deflecting devices 30 are directed toward or aligned with or communicating with the grooves 26 of the nut member 20 for guiding the ball bearing members 8 into or out of the grooves 26 of the nut member 20 respectively and for allowing the ball bearing members 8 to be smoothly move through the endless ball guiding passage 80 in the ball spline device.

Accordingly, the deflecting device in accordance with the present invention includes an anchoring or securing structure or device for suitably anchoring or securing or retaining the deflecting device to the ball spline device and for suitably guiding the ball bearing members to smoothly or effectively move through the endless ball guiding passage of the ball spline device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball spline device comprising:
   an elongated shaft including a plurality of longitudinal channels formed therein,
   a nut member including a bore formed therein for receiving and engaging with said shaft, and including two end portions each having a compartment formed therein and communicating with said bore of said nut member, said compartments of said nut member including an inner diameter (D) greater than an inner diameter (d) of said bore of said nut member for forming an inner peripheral swelling in said nut member, said nut member including a plurality of longitudinal recesses formed in said swelling and communicating with said bore of said nut member and aligned with said longitudinal channels of said shaft, and including a plurality of longitudinal grooves formed therein and communicating with said compartments of said nut member, but offset from said bore of said nut member,
   a plurality of ball bearing members engaged in said longitudinal channels of said shaft and said longitudinal recesses of said swelling of said nut member, and
   two deflecting devices engaged onto said shaft and engaged into said compartments of said nut member and attached to said end portions of said nut member respectively, said deflecting devices each including a plurality of curved guiding pathways formed therein, and said curved guiding pathways of said deflecting devices each including an inlet portion directed toward and communicating with said longitudinal recess of said nut member and said longitudinal channel of said shaft for guiding said ball bearing members into and out of said curved guiding pathways of said deflecting devices respectively, and an outlet portion directed toward and communicating with said groove of said nut member respectively for forming an endless ball guiding passage in said ball spline device and for guiding said ball bearing members into and out of said grooves of said nut member, wherein
   said deflecting devices each include an opening formed therein for slidably receiving and engaging with said shaft, and each include a plurality of bulges extended radially into said opening and slidably engaged with said channels of said shaft for positioning said deflecting devices to said shaft.

2. The ball spline device as claimed in claim 1, wherein said nut member includes two retaining rings engaged in said end portions of said nut member respectively and engaged with said deflecting devices respectively for retaining and positioning said deflecting devices in said nut member.

3. The ball spline device as claimed in claim 1, wherein said curved guiding pathways of said deflecting devices each include a width (W) no less than an outer diameter (B) of said ball bearing members.

4. The ball spline device as claimed in claim 1, wherein said inlet portions of said curved guiding pathways of said deflecting devices are inclined and each include a climbing height (H) smaller than a climbing length (L) of said inlet portions of said curved guiding pathways of said deflecting devices.

5. The ball spline device as claimed in claim 4, wherein said climbing length (L) of said inlet portions of said curved guiding pathways of said deflecting devices is no less than 0.25 times said outer diameter (B) of said ball bearing members, and no greater than 0.5 times said outer diameter (B) of said ball bearing members.

6. The ball spline device as claimed in claim 1, wherein said curved guiding pathways of said deflecting devices each include an inlet curved segment communicating with said inlet portion of said curved guiding pathway of said deflecting device, and an outlet curved segment communicating with said outlet portion of said curved guiding pathway of said deflecting device.

7. The ball spline device as claimed in claim 6, wherein said inlet and said outlet curved segments of said curved guiding pathway of said deflecting device include a radius (r) no less than 0.5 times said outer diameter (B) of said ball bearing members, and no greater than said outer diameter (B) of said ball bearing members.

8. The ball spline device as claimed in claim 6, wherein said inlet curved segment of said guiding pathway of said deflecting device includes a bottom portion (e) jointed at a joint point (g) with a bottom portion (f) of said outlet curved segment of said curved guiding pathway of said deflecting device.

9. The ball spline device as claimed in claim 8, wherein said bottom portion (e) of said inlet curved segment of said curved guiding pathway of said deflecting device includes a center of curvature (a) and a radius (b), and said bottom portion (f) of said outlet curved segment of said curved guiding pathway of said deflecting device includes a center of curvature (O) and a radius (R) greater than said radius (b) of said bottom portion (e) of said inlet curved segment of said curved guiding pathway of said deflecting device.

10. A ball spline device comprising:
an elongated shaft including a plurality of longitudinal channels formed therein,
a nut member including a bore formed therein for receiving and engaging with said shaft, and including two end portions each having a compartment formed therein and communicating with said bore of said nut member, said compartments of said nut member including an inner diameter (D) greater than an inner diameter (d) of said bore of said nut member for forming an inner peripheral swelling in said nut member, said nut member including a plurality of longitudinal recesses formed in said swelling and communicating with said bore of said nut member and aligned with said longitudinal channels of said shaft, and including a plurality of longitudinal grooves formed therein and communicating with said compartments of said nut member, but offset from said bore of said nut member,
a plurality of ball bearing members engaged in said longitudinal channels of said shaft and said longitudinal recesses of said swelling of said nut member, and
two deflecting devices engaged onto said shaft and engaged into said compartments of said nut member and attached to said end portions of said nut member respectively, said deflecting devices each including a plurality of curved guiding pathways formed therein, and said curved guiding pathways of said deflecting devices each including an inlet portion directed toward and communicating with said longitudinal recess of said nut member and said longitudinal channel of said shaft for guiding said ball bearing members into and out of said curved guiding pathways of said deflecting devices respectively, and an outlet portion directed toward and communicating with said groove of said nut member respectively for forming an endless ball guiding passage in said ball spline device and for guiding said ball bearing members into and out of said grooves of said nut member, wherein
said nut member includes a plurality of cavities formed in said swelling and communicating with said compartments of said nut member, and said deflecting devices each include a plurality of positioning pins extended outwardly therefrom for engaging with said cavities of said nut member and for anchoring said deflecting devices to said nut member.

* * * * *